United States Patent [19]

Friedes

[11] Patent Number: 5,444,774
[45] Date of Patent: Aug. 22, 1995

[54] INTERACTIVE QUEUING SYTEM FOR CALL CENTERS

[75] Inventor: Albert Friedes, East Brunswick, N.J.

[73] Assignee: AT&T Corp., Murray Hill, N.J.

[21] Appl. No.: 367,663

[22] Filed: Jan. 3, 1995

Related U.S. Application Data

[63] Continuation of Ser. No. 905,056, Jun. 26, 1992, abandoned.

[51] Int. Cl.⁶ ............................................. H04M 1/64
[52] U.S. Cl. ...................................... 379/266; 379/67; 379/210; 379/214
[58] Field of Search .................... 379/265, 266, 84, 68, 379/70, 213, 214, 67, 201, 210–212

[56] References Cited

U.S. PATENT DOCUMENTS

| | | | |
|---|---|---|---|
| 3,570,008 | 3/1971 | Downing et al. | 340/172.5 |
| 4,150,255 | 4/1979 | Theis et al. | 379/84 |
| 4,611,094 | 9/1986 | Asmuth et al. | 379/201 |
| 4,943,995 | 7/1990 | Daudelin et al. | 379/67 |
| 4,953,204 | 8/1990 | Cuschleg, Jr. et al. | 379/266 |
| 4,982,420 | 1/1991 | Theis | 379/84 |
| 5,001,710 | 3/1991 | Gawrys et al. | 370/110.1 |
| 5,014,303 | 5/1991 | Velius | 379/266 |
| 5,046,088 | 9/1991 | Margulies | 379/265 |

OTHER PUBLICATIONS

"The Smart Way to Handle Incoming Callers", Inbound/Outbound Magazine, May 1990, pp. 22, 24, 27, 28, 30–32 & 34 by Keith Dawson.

"IBM's Callpath Explained", Inbound/Outbound Magazine, Oct. 1989, pp. 15, 16 & 18, by Bill Maikranz.

"AT&T No. 1ESS (Electronic Switching System)" AT&T Technical Journal, vol. 43, No. 5, parts 1 and 2, pp. 1831–2609, Sep., 1964.

"The 5ESS Switching System" AT&T Technical Journal, vol. 64, No. 6, part 2, pp. 1305–1564, Jul./Aug., 1985.

"AT&T Conversant Voice System" AT&T Technical Journal, vol. 65, Issue 5, pp. 34–47, Sep./Oct., 1986.

ISDN Architecture and Standards Evolution. AT&T Technical Journal, vol. 65, Issue 1, pp.5–55, Jan./Feb., 1986.

"No. 4 ESS" Bell System Technical Journal (BSTJ) vol. 56, No. 7, pp. 1015–1320, Sep., 1977.

*Primary Examiner*—Ahmad Matar
*Attorney, Agent, or Firm*—Barry H. Freedman

[57] ABSTRACT

This invention relates to a system and a method for a) queuing a call when no attendants are available to service that call b) soliciting and collecting initial information from the caller while the call is in the holding queue c) querying a database using the collected initial information as search key(s) to retrieve additional information needed to service the call, and d) displaying the collected and/or retrieved information to the next available attendant, as the call is received by that attendant.

6 Claims, 4 Drawing Sheets

FIG. 3

| CALLER ENTERED INFORMATION RECORD | | | | |
|---|---|---|---|---|
| SCRIPT ID | FIELD 1 | FIELD 2 | . . . . | FIELD N |
| 301 | 302 | 303 | 304 | 305 |

FIG. 4

| | |
|---|---|
| SCRIPT FOR SUBSCRIBER 1 | MODULE 1<br>MODULE 2<br>⋮<br>MODULE N |
| SCRIPT FOR SUBSCRIBER 2 | MODULE 1<br>MODULE 2<br>⋮<br>MODULE N |
| ⋮ | ⋮ |
| SCRIPT FOR SUBSCRIBER N | MODULE 1<br>MODULE 2<br>⋮<br>MODULE N |

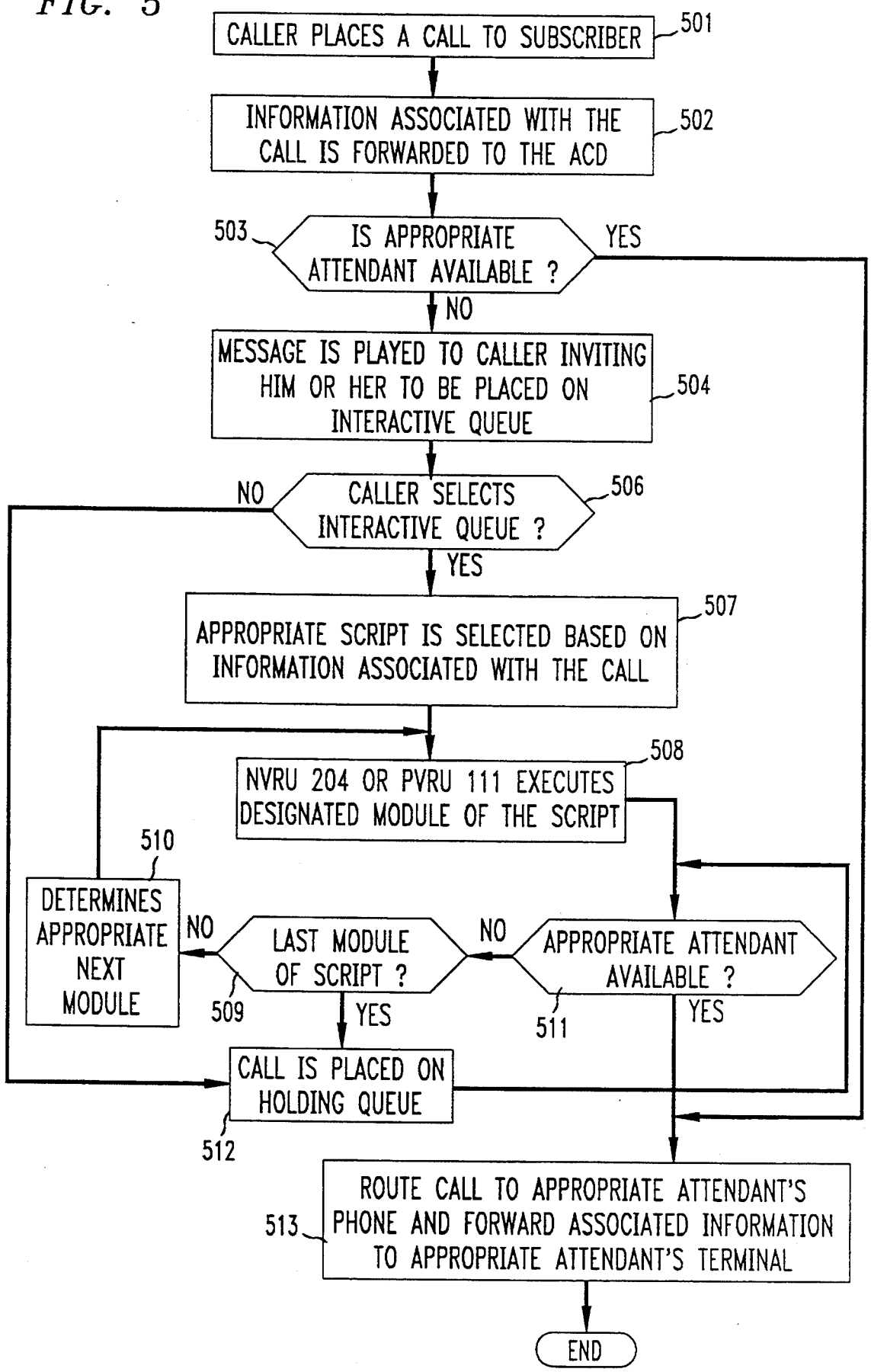

INTERACTIVE QUEUING SYTEM FOR CALL CENTERS

This application is a continuation of application Ser. No. 07/905,056, filed Jun. 26, 1992 (now abandoned).

TECHNICAL FIELD

This invention relates to communication switching systems, and more specifically to a queuing system for calls directed to call centers.

BACKGROUND OF THE INVENTION

For a growing number of public and private organizations, telemarketing is playing an increasingly vital role in specific functions and activities requiring direct communications with a caller/customer. These functions and activities include order entry, customer service, and reservations, to name a few. While call centers (also called telemarketing service centers) vary in the sophistication of their equipment, they are generally staffed by attendants who answer incoming calls and solicit from a caller information that may be needed to query a database for retrieval of other information, such as customers' account data, or product/service information that is of particular interest to that particular caller. In order to serve the maximum number of callers, every call center is designed to optimize call handling efficiency and attendant productivity. In furtherance of that goal, some prior art systems allow telephone attendants to service a greater number of callers by a) ascertaining a caller's basic request through the collection by a live attendant of initial information from the caller, and b) transferring the call to a voice response unit to address the specific request of the caller. Other systems reverse the answer and collection process by connecting the caller initially to a voice response unit which collects information that is ultimately used to route the call to the appropriate attendant. While these techniques increase attendants' productivity, systems implementing these techniques may be limited to business transactions that are rather simple and clearly defined. This deficiency is even more pronounced in other prior art systems that use fully automated, as opposed to semi-automated attendant systems. For moderately complex applications in which callers' requests vary significantly from one call to the next, semi-automated prior art systems may lead to disconnects, connection to the wrong attendant's pool, or a sequence of call transfers, that may be disconcerting to some callers.

Aiming to increase call handling efficiency and attendant productivity, other prior art systems take advantage of Integrated Services Digital Network (ISDN) incoming call identification capabilities to automate the caller's record retrieval process. More specifically, those systems allow a caller's record to be retrieved from a database using the caller's Automatic Number Identification (ANI) as a search key, thereby vitiating the need for a caller to provide verbal information to be used in the the database search operation. The retrieved caller's record is then displayed on the attendant's console as the call is received by the attendant's phone. However, when a call is originated from a telephone set which has a different number than the one stored in the database for a particular customer, the ANI-based automatic record retrieval feature afforded by those prior art systems is of limited help, even though a record may exist in the database for the caller. In addition, when the database has to retrieve product/service information, as opposed to a caller's record, the ANI-based automatic record retrieval feature is again of limited utility, because the database management system is unable to determine solely from the ANI, the particular product or service of interest to the caller.

A common device used in telemarketing centers to enhance attendants' productivity is an Automatic Call Distributor (ACD) which allows a call center to cost-effectively handle a large number of calls by placing some of these calls in a holding queue when no attendants are available to handle them. Before a call is placed in a holding queue, a greeting message identifying the called party is ordinarily played by the ACD to the caller, indicating to him or her that the next available attendant will service the call. During the holding period, music or advertising messages may be played to the caller to entertain or inform the caller of sales promotions for particular products or services. Call queuing plays a very important role in call center operations. Its known advantages include a) increasing attendant's productivity by reducing idle time for attendants b) simultaneously handling a greater number of calls during a burst of calls, and c) encouraging callers to wait for an available attendant as opposed to requiring the caller to attempt another call to the call center in response to a busy tone condition. However, call queuing wastes the caller's time and may result in a) abandoned calls, b) potential loss of business, and c) poor customer satisfaction when the holding time is deemed excessive by a bored or an impatient caller. In addition, placing a call, such as an international toll-free call, in a holding queue for a significant period of time can increase the cost per transaction for each call. Furthermore, when the caller is finally connected to an available attendant, the latter has to solicit and collect from the caller information needed to complete a transaction and/or to retrieve the appropriate record to address the specific request of the caller. The time spent and effort exerted by the attendant for these activities could have been productively used by the same attendant for other functions, such as servicing another call.

SUMMARY OF THE INVENTION

The present invention is directed at a) queuing a call when no attendant is available to service the call b) soliciting and collecting initial information from a caller while the call is in the holding queue c) querying a database using the collected initial information as search key(s) to retrieve additional information needed to service the call, and d) displaying the collected and/or retrieved information on the next available attendant's console as the call is received by that attendant. The invention takes advantage of the features and functionality offered by premises-based ACDs and network-based ACDs.

In an exemplary embodiment of the invention, a caller is invited to be placed on an interactive holding queue when the network-ACD serving attendants at a call center determines that no attendants are available to receive the call. Upon receiving a signal indicative of the caller's willingness to be placed on the interactive queue, appropriate announcements are then played to the caller in order to collect initial information to service the call. The collected information is stored in the communications switching system until an appropriate attendant becomes idle. The availability of an appropriate attendant triggers the forwarding of the initial information (preferably over an ISDN signaling channel) along with the call to a switch serving the idle attendant. The switch, in turn, forwards the initial information to a database to retrieve additional information to service the call. The database returns the additional information and/or the initial information collected by the voice response unit to the switch which establishes an appropriate data path for the collected and/or retrieved information to be displayed on the available attendant's console as the call is completed to that attendant's station set.

In another embodiment of the invention, the initial information is collected by a voice response unit connected to a premises-ACD at the call center location. That information is then used to retrieve additional information before an attendant becomes available. The initial information and/or the retrieved information is then displayed to an available attendant as the call is muted to him or her.

A feature of the invention is to provide a graceful termination of the information collection process when an agent becomes available during that process.

BRIEF DESCRIPTION OF THE DRAWING

In the drawing:

FIG. 3 shows the format of a typical record identifying different fields associated with initial information entered by a caller in response to prompts generated by a voice response unit;

FIG. 4 shows a memory map of different scripts with associated modules stored in the voice response units of FIG. 1 or FIG. 2; and FIG. 5 presents, in flow diagram format, actions taken and decisions formulated by different components of the communication switching system of FIG. 1 or FIG. 2 to implement this invention.

DETAILED DESCRIPTION

Figure 1:
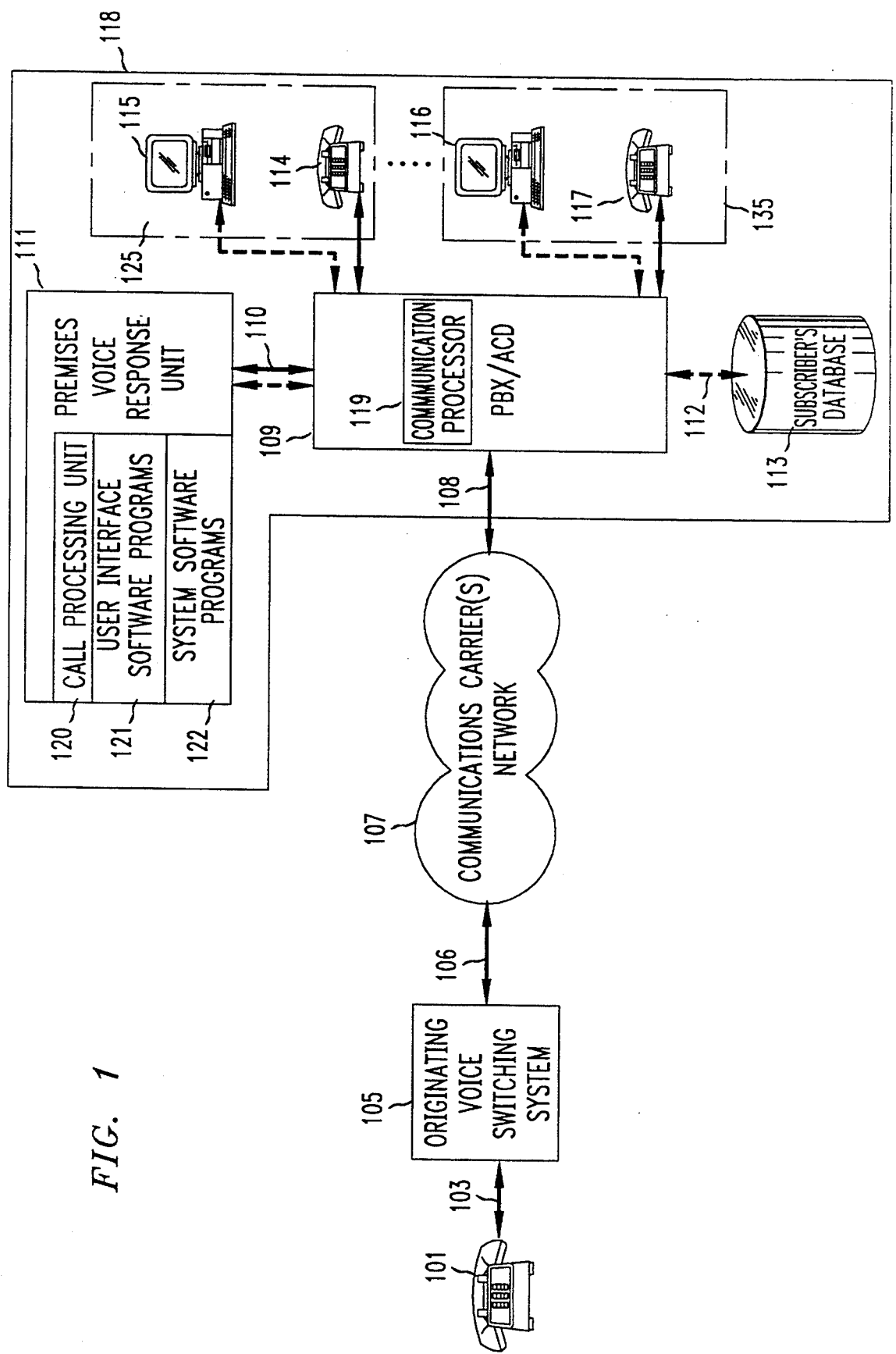
FIG. 1 is a block diagram of a communication switching system connected to a PBX/ACD arranged in accordance with the invention a) to collect initial information from a caller whose call is placed in a holding queue at a call center, and b) to forward the initial information and/or retrieved additional information to an attendant's console when the call is connected to the attendant's telephone set.

FIG. 1 is block diagram of a communication switching system connected to a PBX/ACD arranged in accordance with the invention a) to collect initial information from a caller whose call is placed in a holding queue at a call center, and b) to forward the initial information and/or retrieved additional information to an attendant's console when the call is connected to the attendant's telephone set. In FIG. 1, a caller at station set 101 places a call to call center 118. The call is routed to originating voice switching system 105 via line 103. Originating voice switching system 105 is a central office switch which may be, by way of example, an electronic program-controlled telecommunication switching system, such as the AT&T No. 1ESS® (Electronic Switching System) or the AT&T #5ESS® switch. The No. 1ESS is described in the *Bell System Technical Journal* (BSTJ), September, 1964, Volume XLIII, Number 5, Parts 1 and 2, and in U.S. Pat. No. 3,570,008 issued to R. W. Downing, et al., on Mar. 9, 1971. A detailed description of the AT&T #5ESS® switch is provided in *AT&T Technical Journal*, Vol. 64, No. 6, pan 2, pp. 1305–1564, July/August, 1985.

Upon determining that the call is destined for a called party at call center 118, originating voice switching system 105 forwards the dialed digits along with the calling party number (if available) to communications carrier network(s) 107 via trunk 106. Communications carrier network(s) 107 may be a Local Exchange Carrier (LEC) network, an interexchange carrier network or a combination of both. Communications carrier network(s) 107 is comprised of telephone switching and signaling systems, which are interconnected by transmission lines and which are arranged to route calls to appropriate destinations. In addition, communications carrier network(s) 107 may also include routing databases and other adjunct processors connected to the switching or signaling systems. The telephone switching systems may include, for example, interconnected local exchange carrier central office switches, such as the AT&T #5ESS® switch mentioned earlier and/or interexchange carder switches, such as the AT&T #4ESS switch described in *Bell System Technical Journal* (BSTJ), Vol. 56, No. 7, pp. 1015–1320, September 1977.

Communications carder network(s) 107 completes the call via one of the channels of trunk group 108 to PBX/ACD 109 of call center 118. PBX/ACD 109 is a premises-based voice switching system, designed to a) receive calls destined for call center 118, and b) queue them when either all stations at call center 118 are busy or when a call with a particular characteristic cannot be handled by attendants within a particular pool of attendants (sometimes called an attendant split) assigned to service calls with those characteristics. PBX/ACD 109 may be implemented using, for example, the AT&T Definity® PBX with Automatic Call Distribution (ACD) capability. It is worth noting that an ACD may be implemented as a stand-alone, computer-controlled, call processing device comprised of a switching matrix arranged to a) accept incoming calls, b) queue them when no attendants are available, and c) distribute those calls to attendants or specific groups of attendants according to some prearranged scheme, such as a hunt group, to insure even call handling loads among attendants. An ACD also provides various kinds of reports and statistical information on trunk utilization, attendant productivity, abandoned calls, average holding time, etc. ACD functionality can be integrated in either a PBX (as is the case for PBX/ACD 109) or a central office switch. Thus, a digital PBX with automatic call distribution capability provided by the Local Exchange Carder (LEC) central office switch may also be used to implement this aspect of the invention. The central nerve of PBX/ACD 109 is communication processor 119, comprised of logic circuitry and software that allows PBX/ACD 109 a) to route a call to a specific attendant position (125, 135) within a pool of attendants based on received information associated with a call (such as ANI) and/or call center specified parameters, b) to transfer calls to premises voice response unit 111 when no attendant positions are available to service a particular call, and c) to place a call on a holding queue, if needed. Each attendant position (125, 135) is defined as a combination of a station set and an associated console that is used by an attendant to enter or receive data to complete a transaction with a caller. Communications processor 119 is also responsible for controlling communications between database 113 and PBX/ACD 109. Database 113 is a processor-controlled centralized database facility a) running database management system software (such as Informix SQL®), and b) equipped with information storage devices that contain data relevant to a subscriber's particular business, such as customer account data, products/services data, reservation data, etc.

Also connected to PBX/ACD 109 via line 110 is premises voice response unit 111, hereafter called PVRU 111 for short. Line 110 is comprised of a) a signaling channel (represented by the broken line) that carries data collected by PVRU 111 to PBX/ACD 109, and b) voice channels (represented by the solid line) used to transfer voice calls between PBX/ACD 101 and PVRU 111. The latter is a voice information system arranged to a) prompt a caller for specific information by asking questions based on a set of modules in a transaction script, b) collect that information by detecting and interpreting dual tone multifrequency signals entered by the caller or by recognizing speech input from the caller, and c) organize the collected information in a specific format and d) forward the collected information to PBX/ACD 109 via the signaling channel of line 110. PVRU 111 is comprised of call processing unit 120 which executes two types of programs, namely user-interface software programs 121 and system software programs 122. User-interface software programs 121 of PVRU 111 include modules of a transactions script which is a sequence of questions posed to a caller to elicit answers in the form of dual tone multiple frequency or speech input. The modules of a transaction script are executed in specified order (which may vary based on the caller's responses) to answer incoming calls destined for call center 118 and to greet callers with pre-recorded voice prompts to direct callers to enter specific information to process their calls. System software programs 122 of PVRU 111, by contrast, include primitives to detect dual tone multiple frequency signals entered by the caller and speech recognition software to identify speech input provided by a caller. Call processing unit 120 of PVRU 111 receives signals from PBX/ACD 109 and triggers execution of specific subprograms in system software programs 122, based on the signals received. For example, when call processing unit 120 of PVRU 111 receives a signal indicating that an attendant is available to service the call in the holding queue, system software programs 122 determine whether the module of the script currently being executed to collect information from the caller is at its end. If it is, the call processing unit a) prevents the next module in the script from being executed, b) plays a short message to the caller indicating that the call is being connected to a live attendant and c) transfers the call along with the collected data to PBX/ACD 109. A voice response unit may be implemented using the AT&T Conversant®Voice System, whose architecture and features are described in *AT&T Technical Journal* Vol. 65, Issue 5, pp. 34–47, September/October 1986.

The initial information collected by PVRU 111 is forwarded to PBX/ACD 109 and subscriber's database 113 which determines individually or collectively the type of information that will be displayed on an attendant's screen. It is to be understood that multiple screens can be displayed if the attendants use multi-windowing consoles or intelligent terminals using interleaved windowing software. The retrieved information is returned to PBX/ACD 109 which forwards that information for display on attendant's console 115 or 116 as PBX/ACD 109 completes the call to telephone set 114 or 117.

Figure 2:
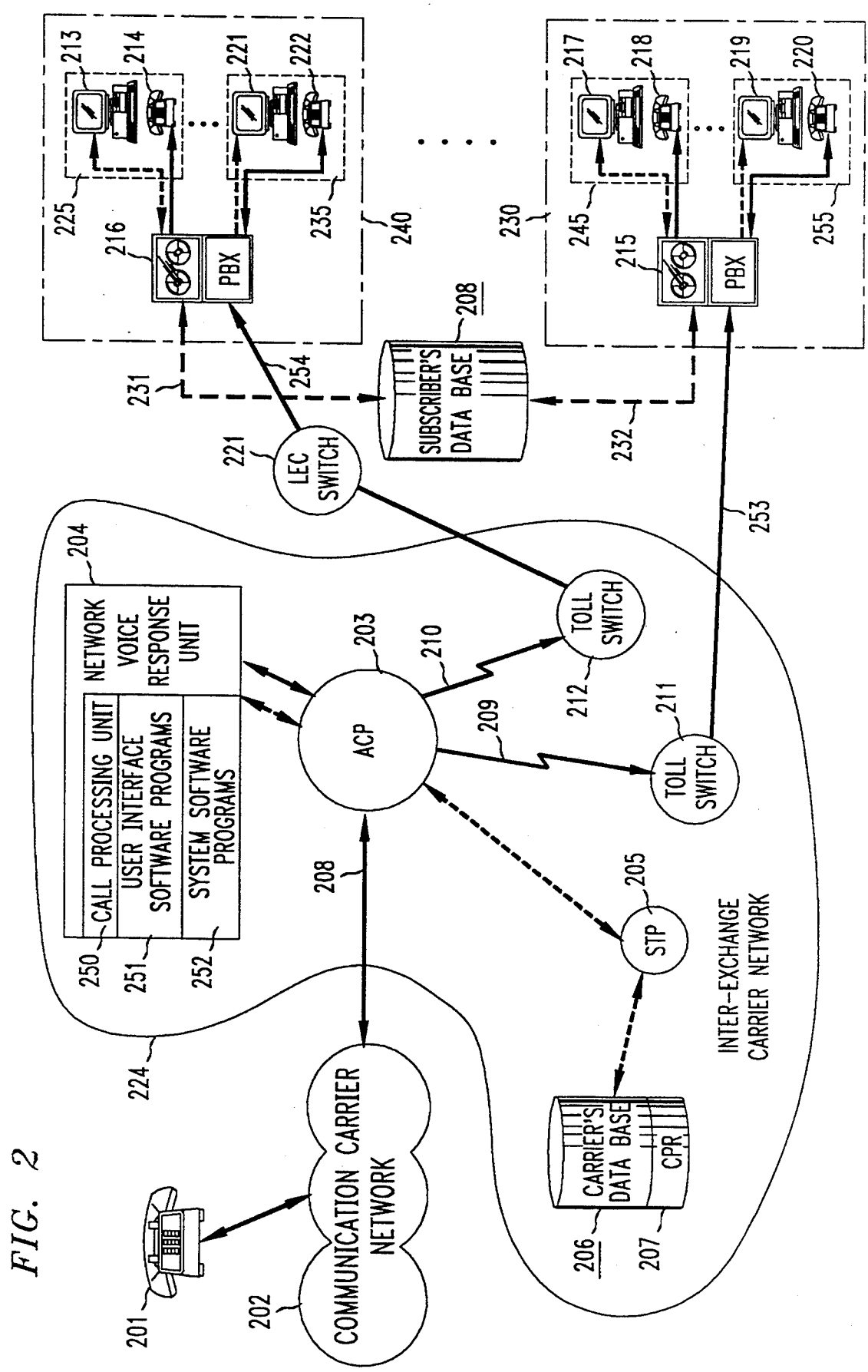
FIG. 2 is a block diagram of a system similar to FIG. 1, but intended for implementing the invention in a network-ACD environment.

FIG. 2 is a block diagram of an arrangement similar to FIG. 1, but intended for implementing the invention in a network-ACD environment. Unlike the premises-based implementation of FIG. 1, the configuration of FIG. 2 provides the automatic call distribution (ACD) and the information gathering capabilities in the telecommunications network itself (such as interexchange carrier network 224) as opposed to providing those capabilities in a premises-based switching system, such as PBX/ACD 109 and PVRU 111 of FIG. 1. In FIG. 2, when a caller at station set 201 dials, for instance, a toll-free number to reach a call center, such as call center location 230 or 240, communications carrier network 202 recognizes that the call is to be routed via interexchange carder network 224 and accordingly, forwards the dialed digits and the caller's ANI to Action Point (ACP) 203. The latter is the point of entry for all traffic originating from LEC network 202 and to be routed via interexchange carrier network 224. It also serves as the access point to the signaling network represented, for the sake of simplicity, by STP 205. U.S. Pat. No. 4,611,094 issued on Sep. 9, 1986 to R. L. Asmuth, et al. provides a general description of an ACP.

Upon receiving the dialed number and the caller's ANI from communications carrier network 202, ACP 203 uses the dialed number and the ANI to launch a query on the signaling network (STP 205) to retrieve from carrier's database 206, a call processing record, such as CPR 207, which contains routing data and instructions associated with the dialed number. Database 206 stores in addition to CPR 207, a record of active calls at each call center location (230 and 240) and within each attendant pool servicing calls with specific characteristics. The number of active calls at all call center locations is updated as calls are initiated and terminated at those centers. It is to be understood that an attendant pool may cross call center location boundaries and can include attendant positions at two or more different locations. For more information regarding multilocation queuing, refer to U.S. Pat. No. 4,953,204 issued on Aug. 28, 1990 to Cuschleg, Jr. et al.

Upon determining that all agents capable of handling the call are currently busy servicing other calls, database 206 sends a signal via STP 205 and ACP 203 to Network Voice Response Unit 204 (hereafter called NVRU) directing the latter to collect information from the caller. NVRU 204 is a network-based voice response unit which offers features and functionality similar to that described for PVRU 111 of FIG. 1. Accordingly, call processing unit 250, user interface software programs 251 and system software programs 252 are functionally equivalent to call processing unit 120, user interface software programs 121 and system software programs 122 of FIG. 1. The scope of applications and capabilities of NVRU 204, however is more diverse than PVRU 111 in the sense that it can, for example, collect information from callers placing calls destined for various subscribers at multiple call centers, as opposed to a single call center. NVRU 204 receives from carrier's database 206 the caller's ANI, the dialed digits and other information to determine the appropriate transaction script to execute in order to collect information from the caller. Alternatively, carder's database 206 can send a signal to NVRU 204 indicating the specific script to be executed based, for instance, on the ANI, the dialed number and other information associated with the call. As is the case for PVRU 111, if during the execution of the script, NVRU 204 receives from carder's database 206 (via ACP 203 or in cooperation with ACP 203) a signal indicating that an appropriate attendant is available to service the call, NVRU 204 terminates the execution of the script at the end of the module of the script currently being executed, in order to allow a graceful termination of the initial information collection process. As mentioned above, database 206 updates the number of active calls at all call center locations by receiving signals indicating termination of call at those call center locations. Database 206 is arranged to associate termination of a call at a particular call center with availability of a particular attendant within an attendant pool.

The initial information collected by NVRU 204 is then forwarded to ACP 203, which routes that information along with the call to the appropriate PBX (216 or 215). ACP 203 also forwards to PBX 216 or 215 data indicating the specific attendant subgroup (245 or 255) for PBX 215 or (225 or 235) for PBX 216. The collected information is forwarded to either PBX 215 via trunk 253 or to PBX 216 via LEC switch 221 and trunk 254. Trunks 253 and 254 are preferably Integrated Services Digital Network (ISDN) Primary Rate Interface (PRI) transmission lines. One of the key attributes of the ISDN PRI standard is the support for twenty-four 64 Kbps channels over a standard DS-1 facility. Of particular importance is the portion of the standard requiring the use of twenty three of those channels to carry voice or data information and one common channel to exclusively carry signaling information for the other twenty-three channels. The signaling channel can be used, for instance, to carry user information, such as calling party number, calling party name, and other types of information associated with the call. Additional information regarding ISDN standards in general, and PRI interface in particular, can be found in *AT&T Technical Journal*, Vol. 65, Issue 1, pp. 4–55 January/February 1986. It is to be understood that while trunks 253 and 254 do not need to conform to ISDN PRI interface standards, the implementation of these standards on these trunks provides a practical mechanism for PBX 215 or PBX 216 to associate initial information collected by NVRU 204 and received by PBX 215 or 216 to the call for which that initial information was gathered.

PBX 215 or 216, in conjunction with subscriber's database 208, uses the received information collected by NVRU 204 to determine the appropriate additional information to be displayed on the available attendant's console. PBX 216 or 215 queries subscriber's database 208, which is a repository of a subscriber's business-related data, such as customer account or product/service data, to retrieve the additional information to be displayed on the screen of an attendant's console. It is to be understood that subscriber's database 208 does not need to be co-located with PBX 216 or 215, since links 231 and 232 can be high speed transmission lines connecting PBX 215 and 216 to subscriber's database 208 at a remote location. Once PBX 215 or 216 receives additional information from subscriber's database 208, that information and/or the initial information collected by NVRU 204 is forwarded to either a) console 217 or 219 for PBX 215 or b) to console 213 or 221 for PBX 216 and the call is completed to station set 218 or 220 for PBX 215 or 214 or 222 for PBX 216.

FIG. 3 shows the format of a record stored in PVRU 111 of FIG. 1 or NVRU 204 of FIG. 2 identifying different fields entered by a caller in response to prompts associated with a script executed by PVRU 111 or NVRU 204. Script-ID 301 of FIG. 3 refers to the specific script executed by PVRU 111 of FIG. 1 or NVRU 204 of FIG. 2. As mentioned earlier, depending on information received by PVRU 111 or NVRU 204, different scripts stored in PVRU 111 or NVRU 204 may be executed. Each entry or speech input provided by a caller, in response to a prompt from PVRU 111 or NVRU 204 is stored in a specific field in the record of FIG. 3.

FIG. 4 shows a memory map of different scripts with associated modules stored either in PVRU 111 of FIG. 1 or NVRU 204 of FIG. 2. In FIG. 4, each module provides the caller with a prerecorded menu of options from which to choose a particular item, such as a number on a dial pad or a specific speech input. The choice of an option leads user interface programs 121 of FIG. 1 or 251 of FIG. 2 described above, to determine the next module to be executed within the modules of a specific script.

The process contemplated by this invention is initiated in step 501 of FIG. 5 when a caller places a call to a call center. The call must be destined for either a subscriber using multilocation queuing capability available from a communication carrier or a subscriber having a PBX/ACD supporting interactive call queuing feature (as in FIG. 1). In step 502, information associated with the call, such as ANI and dialed number, is forwarded to the ACD by the (LEG) central office switch (originating voice switching system 105 of FIG. 1 or switch in communication carder network 202) serving the caller. In a premises-based environment (FIG. 1), that information is received by PBX/ACD 109. In a networkbased ACD environment, (FIG. 2) that information is received by ACP 203 which sends it via the signaling network (STP 205) to carrier's database 206. In step 503, PBX/ACD 109 determines whether an appropriate attendant is available to service the call. In this context, an "appropriate attendant" means an attendant within the attendant pool or split assigned to handle certain calls matching the characteristics identified by the ANI, dialed number or other relevant parameters. Similarly, in a network-ACD implementation, carrier's database 206 determines whether an appropriate attendant is available using, for example, the technique described in the Cuschleg patent cited above. If an attendant is available, in step 513, the call is completed according to conventional techniques. For example, information associated with the call may be used as a search key to retrieve (if possible) pertinent information from database 208 or 112 to service the call. The retrieved information is displayed on the attendant's console as the call is completed to that attendant's station set. If no attendant is available to service the particular call, in step 504, information associated with the call (ANI, dialed number, etc.) and/or a signal identifying particular scripts to be executed, is forwarded to PVRU 111 or NVRU 204. In step 504, PVRU 111 or NVRU 204 executes an initial one module-script to play a message to the caller inviting him or her to be placed on the interactive queue. If the caller chooses not to exercise the interactive queue option, in step 506, the call is placed in a conventional holding queue in step 5 12. If the caller agrees to be placed in the interactive queue, NVRU 204 or PVRU 111 selects, in step 507, a transaction script (assuming that a scripts was not chosen already by PBX/ACD 109 or carrier's database 206) matching the characteristics of the received information associated with the call. In step 508, NVRU 204 or PVRU 111 executes the designated module of that script. The designated module can be either the first module of a script or the next logical module in a sequence as determined by the user interface programs. While PVRU 111 or NVRU 204 is collecting information from the caller the active call processing unit (call processing unit 120 of FIG. 1, for example) monitors the link connecting PVRU 111 to PBX/ACD 109 or NVRU 204 to carrier's database 206 to determine (step 509) whether a signal has been forwarded by PBX/ACD or carrier's database 206 (via ACP 203) indicating that an attendant within the appropriate split is available. If no attendant has become available, PVRU 111 or NVRU 204 determines in step 510 whether there is another module left in the script. Upon an affirmative answer to that inquiry, PVRU 111 or NVRU 204, in step 511, determines the appropriate next module in the script to be executed. PVRU 111 or NVRU 204 repeats steps 508 through and 511 until an appropriate attendant becomes available or all modules in the script have been executed. When no more modules are left in the script, PVRU 111 or NVRU 204 places the call in a holding queue, in step 512. When an attendant becomes available, in step 513, VRU 411 or NVRU 204 forwards the call and the initial collected information to PBX/ACD 109 or PBX 215 (216). The latter uses the received initial caller entered information to query database 112 (208) to retrieve the appropriate additional information needed to be displayed on the screen(s) of the attendant's console as the call is delivered to the attendant's station set.

Advantageously, the invention partially relieves the attendant of the tasks of a) soliciting initial information from the caller to complete the transaction, and b) querying a database to either retrieve customer history or product information files to service the call or get access to screen layout to enter data recording the transaction associated with the call. The invention also makes efficient use of the caller's time by offering the caller the opportunity to provide information needed to service the call while waiting for an attendant to become available.

The above description is to be construed only as an illustrative embodiment of this invention. Persons skilled in the art can easily conceive of alternative arrangements providing similar functionality without any deviation from the fundamental principles or the scope of this invention.

I claim:

1. A method of completing a call placed by a caller and directed to a call center having attendants to answer incoming calls, said method comprising the steps of:
   determining that no attendant is available to answer said call;
   in response to unavailability of any attendant to answer said call, placing said call in a holding queue;
   collecting information provided by said caller in response to a presentation of a logical sequence of prompting messages to said caller while said call is in said holding queue, said presentation accomplished through execution of at least two modules of a transaction script, wherein each module is associated with specific data to be solicited and collected from said caller;
   retrieving additional information from a database using at least part of said collected information as a search key;
   in response to a signal indicating availability of an attendant to answer said call, completing the collection of said data for the module currently being executed;
   preventing the execution of any other module in said transaction script in order to gracefully terminate said collecting step; and
   forwarding to said available attendant said call, and data associated with at least one element selected from a group of elements comprised of said collected information, and said retrieved information.

2. The method of claim 1, wherein said prompting messages are presented to said caller to solicit particular information from said caller, based on routing information associated with said call.

3. In a communication switching system comprised of a call center arranged to receive incoming calls from callers, a method of processing said calls comprising the steps of:
   offering said callers an option to wait in a holding queue when said calls cannot be completed; and
   while said callers are waiting in said queue, obtaining information from said callers in response to a presentation of a logical sequence of prompting messages, said presentation accomplished through execution of at least two modules of a transaction script, wherein each module is associated with specific data to be solicited and collected from a caller;
   in response to a signal indicating availability of an attendant, completing the collection of said data for the module currently being executed in order to gracefully terminate said information obtaining step; and
   routing said call and said obtained information to said available attendant.

4. A system of completing a call placed by a caller and directed to a call center having attendants to answer incoming calls, comprising:
   means for determining that no attendant is available to answer said call;
   means responsive to lack of an available attendant to answer said call, for placing said call in a holding queue
   means for collecting information provided by said caller in response to a presentation of a logical sequence of prompting messages to said caller while said call is in said holding queue, said presentation accomplished through execution of at least two modules of a transaction script, wherein each module is associated with specific data to be solicited and collected from said caller;
   means for retrieving additional information from a database using at least part of said collected information as a search key;
   means responsive to a signal indicating availability of an attendant to answer said call, for completing the collection of said data for the module currently being executed in order to gracefully terminate said information collection; and
   means for forwarding to said available attendant said call, and data associated with at least one element selected from a group of elements comprised of said collected information, and said retrieved additional information.

5. The system of claim 4 wherein said prompting messages are presented to said caller to solicit particular information from said caller based on routing information associated with said call.

6. A system of completing a call that is placed by a caller and that is destined for a call center staffed by a plurality of attendants, said system comprising:

means for determining availability of at least one attendant within a particular pool of such attendants assigned to service calls with characteristics of said call;

means for placing said call in a holding queue when no attendant within said pool is available;

means for collecting data from said caller while said call is in said holding queue, said collecting means including means for executing at least two modules of a transaction script, wherein each module is associated with specific data to be solicited and collected from said caller;

means for retrieving prestored information from a database using said collected data as search keys;

means responsive to a signal indicating the availability of an attendant within said pool, for completing the collection of said data for the module currently being executed in order to gracefully terminate said information collection; and means for displaying said information or said data or both to said available attendant as the call is received by said available attendant's telephone set.

* * * * *